(12) United States Patent
Chao

(10) Patent No.: US 11,104,545 B2
(45) Date of Patent: Aug. 31, 2021

(54) ELEVATOR SAFETY ACTUATOR SYSTEMS

(71) Applicant: Otis Elevator Company, Farmington, CT (US)

(72) Inventor: Lifeng Chao, Cheshire, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 305 days.

(21) Appl. No.: 16/214,634

(22) Filed: Dec. 10, 2018

(65) Prior Publication Data
US 2020/0180908 A1 Jun. 11, 2020

(51) Int. Cl.
*B66B 5/06* (2006.01)
*B66B 5/18* (2006.01)
*B66B 5/22* (2006.01)
*F16H 1/28* (2006.01)

(52) U.S. Cl.
CPC ............... *B66B 5/06* (2013.01); *B66B 5/18* (2013.01); *B66B 5/22* (2013.01); *F16H 1/28* (2013.01)

(58) Field of Classification Search
CPC .... B66B 5/06; B66B 5/18; B66B 5/22; F16H 1/28
See application file for complete search history.

(56) References Cited

U.S. PATENT DOCUMENTS

| 865,486 | A | * | 9/1907 | Gannon | F16D 7/08 464/36 |
| 2,298,167 | A | * | 10/1942 | Rissler | B66B 5/18 187/352 |
| 3,754,412 | A | * | 8/1973 | Briggs | F16D 7/08 192/17 C |
| 4,662,481 | A | * | 5/1987 | Morris | B66B 5/044 187/373 |
| 5,052,523 | A | * | 10/1991 | Ericson | B66B 5/20 187/350 |
| 5,217,091 | A | | 6/1993 | Shiina et al. | |
| 5,363,942 | A | * | 11/1994 | Osada | B66B 5/22 187/376 |
| 5,377,786 | A | * | 1/1995 | Nakagawa | B66B 5/044 187/276 |

(Continued)

FOREIGN PATENT DOCUMENTS

| AU | 4791996 A | 9/1996 |
| CN | 1611441 A | 5/2005 |

(Continued)

OTHER PUBLICATIONS

European Search Report for European Application No. 19213355.1, International Filing Date Dec. 3, 2019, dated May 7, 2020, 8 pages.

*Primary Examiner* — Michael A Riegelman
(74) *Attorney, Agent, or Firm* — Cantor Colburn LLP

(57) ABSTRACT

Elevator systems are provided. The elevator systems include a traveling component movable along a guide rail within an elevator shaft, the traveling component comprising a roller guide moveably engageable with the guide rail and an overspeed safety system. The overspeed safety system includes an actuator module operably coupled to the roller guide and a safety brake operably connected to the actuator module by a connecting link, wherein a safety brake element of the safety brake is operable to engage with the guide rail to stop movement of the traveling component.

19 Claims, 11 Drawing Sheets

(56) References Cited

U.S. PATENT DOCUMENTS

| | | | | |
|---|---|---|---|---|
| 6,345,696 | B1* | 2/2002 | Yumura | B66B 5/044 187/287 |
| 6,631,790 | B2* | 10/2003 | Mattlar | B66B 5/02 187/288 |
| 6,763,742 | B1* | 7/2004 | Lehmann | G06T 7/13 74/527 |
| 7,607,516 | B2* | 10/2009 | Simon | B66B 5/0043 187/285 |
| 7,614,481 | B2* | 11/2009 | Okamoto | B66B 5/06 187/305 |
| 7,950,499 | B2* | 5/2011 | Okamoto | B66B 7/046 187/394 |
| 8,342,294 | B2* | 1/2013 | Madoz Michaus | B66B 5/044 187/373 |
| 9,193,565 | B2* | 11/2015 | Piech | B66B 7/046 |
| 9,975,733 | B2 | 5/2018 | Cunningham et al. | |
| 2004/0079591 | A1* | 4/2004 | Mueller | B66B 5/06 187/287 |
| 2004/0112683 | A1* | 6/2004 | Liebetrau | B66B 5/18 187/372 |
| 2005/0241886 | A1* | 11/2005 | Marti | B66B 5/18 187/351 |
| 2007/0056808 | A1* | 3/2007 | Shimohata | B66B 5/06 187/373 |
| 2007/0102256 | A1* | 5/2007 | Bacon | F16D 27/115 192/70.2 |
| 2010/0133046 | A1* | 6/2010 | Allwardt | B66B 7/062 187/251 |
| 2011/0088983 | A1* | 4/2011 | Sirigu | B66B 5/22 187/373 |
| 2012/0205198 | A1* | 8/2012 | Okada | B66B 5/22 187/350 |
| 2013/0001020 | A1* | 1/2013 | Kigawa | B66B 5/00 187/254 |
| 2013/0105250 | A1* | 5/2013 | Meierhans | B66B 5/046 187/350 |
| 2015/0083528 | A1* | 3/2015 | Kattainen | B66B 5/0037 187/393 |
| 2016/0214834 | A1* | 7/2016 | Cunningham | B66B 5/18 |
| 2017/0001835 | A1* | 1/2017 | Hu | F16D 65/16 |
| 2018/0162693 | A1* | 6/2018 | Hu | B66B 7/048 |
| 2018/0244495 | A1* | 8/2018 | Swaybill | B66B 1/40 |
| 2018/0273343 | A1* | 9/2018 | Piedra | B66B 1/3492 |
| 2018/0327224 | A1* | 11/2018 | Billard | B66B 5/22 |
| 2019/0234985 | A1* | 8/2019 | Billard | G01P 3/487 |
| 2019/0382240 | A1* | 12/2019 | Schaeuble, Jr. | B66B 1/28 |
| 2020/0048041 | A1* | 2/2020 | Fauconnet | B66B 5/06 |
| 2020/0180908 | A1* | 6/2020 | Chao | B66B 5/18 |

FOREIGN PATENT DOCUMENTS

| | | |
|---|---|---|
| CN | 101072723 A | 11/2007 |
| CN | 101679001 A | 3/2010 |
| CN | 103086226 A | 5/2013 |
| DE | 69326435 T2 | 5/2000 |
| EP | 1749785 A1 | 2/2007 |
| KR | 1020100136693 A | 12/2010 |
| WO | 2017098299 A1 | 6/2017 |

* cited by examiner

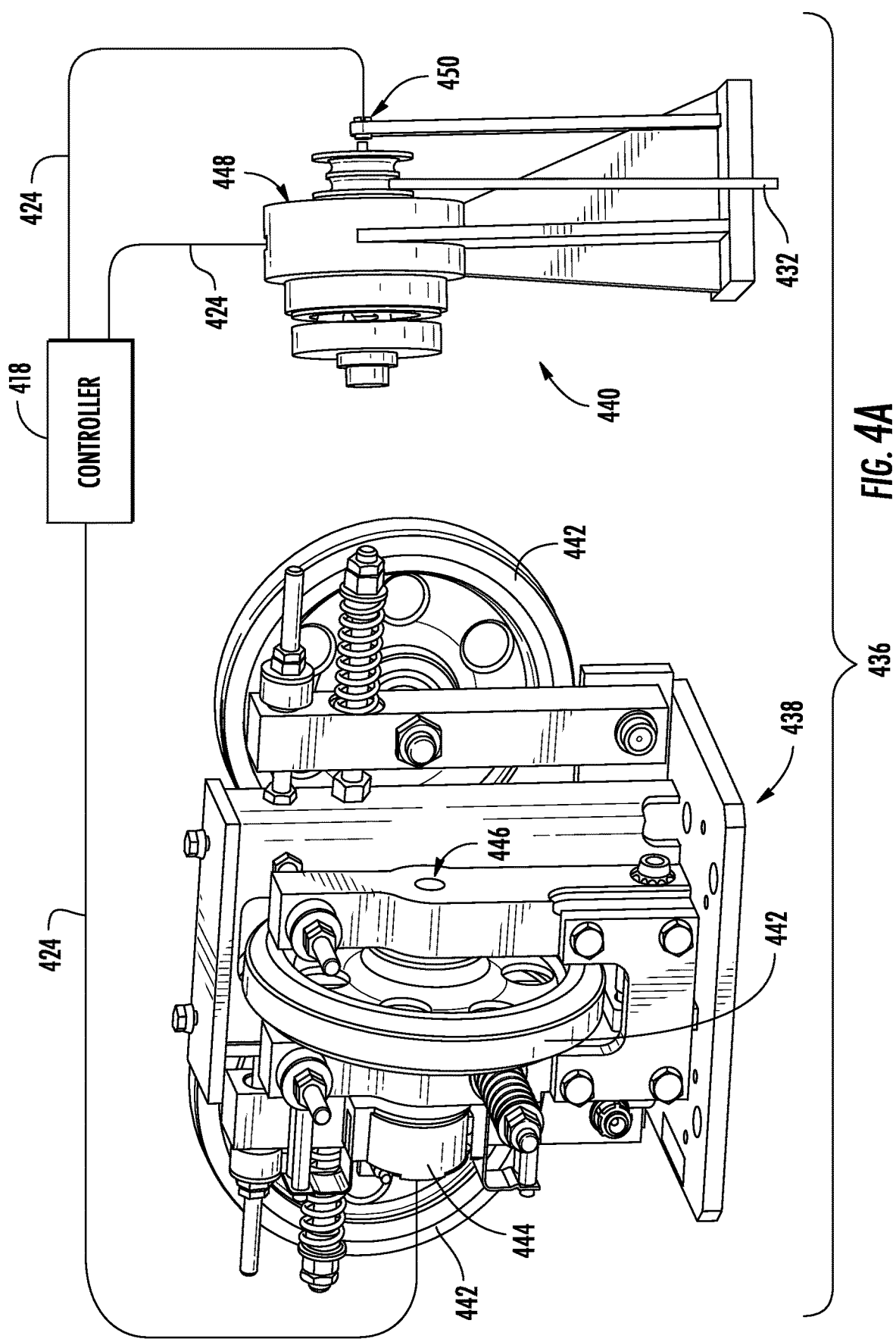

ELEVATOR SAFETY ACTUATOR SYSTEMS

BACKGROUND

The subject matter disclosed herein generally relates to elevator systems and, more particularly, to safety systems for elevators and a control thereof in the event of overspeeding.

Typical elevator mechanical safety systems use governor overspeed systems coupled to a mechanical safety actuation module connected to safety brakes that activates in the event of a car overspeed event, car overacceleration event, or free fall—i.e., to stop an elevator car that is travelling too fast. Such safety actuation modules include a linking mechanism to engage two or more car safety brakes simultaneously (i.e., on both guide rails). The governor is located either in a machine room, in the hoistway, or may be mounted to the elevator car. The safety actuation module is typically made of a linkage that is located above the car or below the car platform—i.e., spanning the width of the elevator car to link opposing sides at the guide rails. However, recent developments have created electrical overspeed safety systems without typical linkages across the car for controlling operation of the elevator car during overspeed, overacceleration, free fall situations.

BRIEF SUMMARY

According to some embodiments, elevator systems are provided. The elevator systems include a traveling component movable along a guide rail within an elevator shaft, the traveling component comprising a roller guide moveably engageable with the guide rail and an overspeed safety system having an actuator module operably coupled to the roller guide and a safety brake operably connected to the actuator module by a connecting link, wherein a safety brake element of the safety brake is operable to engage with the guide rail to stop movement of the traveling component.

In addition to one or more of the features described above, or as an alternative, further embodiments may include the actuator module comprising a first disc configured to selectively engage with the roller guide, the first disc moveable between a first position wherein a gap is present between the first disc and the roller guide and a second position wherein the first disc is engaged with the roller guide such that rotation of a part of the roller guide causes rotation of the first disc.

In addition to one or more of the features described above, or as an alternative, further embodiments may include a reel operably connected to the first disc, wherein rotation of the first disc causes rotation of the reel.

In addition to one or more of the features described above, or as an alternative, further embodiments may include that the connecting link is windable about the reel, wherein when the connecting link is wound about the reel the connecting link causes the safety brake to engage with the guide rail.

In addition to one or more of the features described above, or as an alternative, further embodiments may include a drive shaft connected to the first disc such that rotation of the first disc causes rotation of the drive shaft and a bushing connected to the reel and arranged about the drive shaft such that rotation of the drive shaft causes rotation of the reel.

In addition to one or more of the features described above, or as an alternative, further embodiments may include that the drive shaft is integrally formed with the first disc and the bushing is integrally formed with the reel.

In addition to one or more of the features described above, or as an alternative, further embodiments may include a gear assembly configured to transfer rotational movement of the first disc to the reel.

In addition to one or more of the features described above, or as an alternative, further embodiments may include that the gear assembly comprises an inner gear operably connected to the first disc, at least one intermediate gear operably connected to the reel, and an outer gear fixedly connected to an actuator module housing.

In addition to one or more of the features described above, or as an alternative, further embodiments may include that the inner gear is attached to or integrally formed with a drive shaft connected to the first disc.

In addition to one or more of the features described above, or as an alternative, further embodiments may include a second disc operably connected to the roller guide, wherein in the second position the first disc is engaged with the second disc.

In addition to one or more of the features described above, or as an alternative, further embodiments may include that the second disc is operably connected to a shaft of the roller guide.

In addition to one or more of the features described above, or as an alternative, further embodiments may include that the first disc comprises at least one first engagement feature and the second disc comprises at least one second engagement feature, wherein when the first disc is engaged with the second disc, the at least one first engagement feature engages with the at least one second engagement feature.

In addition to one or more of the features described above, or as an alternative, further embodiments may include that the at least one first engagement feature comprises a pin and the at least one second engagement feature comprises a recess.

In addition to one or more of the features described above, or as an alternative, further embodiments may include a biasing element arranged to bias the pin into the recess.

In addition to one or more of the features described above, or as an alternative, further embodiments may include a magnetic element arranged within the first disc and a coil arranged within the actuator module, the coil configured to be energized to generate a magnetic field, wherein when energized the coil causes the first disc to transition from the first position to the second position.

In addition to one or more of the features described above, or as an alternative, further embodiments may include a safety system controller operably connected to the actuator module and configured to cause the first disc to transition between the first and second positions.

In addition to one or more of the features described above, or as an alternative, further embodiments may include an encoder operably connected to the roller guide, wherein the encoder is configured in communication with the safety system controller.

In addition to one or more of the features described above, or as an alternative, further embodiments may include that the encoder and the first disc are operably engageable with a single shaft of the roller guide.

In addition to one or more of the features described above, or as an alternative, further embodiments may include a sensor portion configured to detect operation of the actuator module.

In addition to one or more of the features described above, or as an alternative, further embodiments may include that the sensor portion comprises a sensor configured to detect a position of the first disc, wherein the sensor is configured to detect at least one of a position and a rotation of a detectable element operably connected to the first disc.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited by the accompanying figures in which like reference numerals indicate similar elements.

FIG. 4A is a schematic illustration of a roller guide actuator system in accordance with an embodiment of the present disclosure in a semi-exploded view;

DETAILED DESCRIPTION

Figure 1:
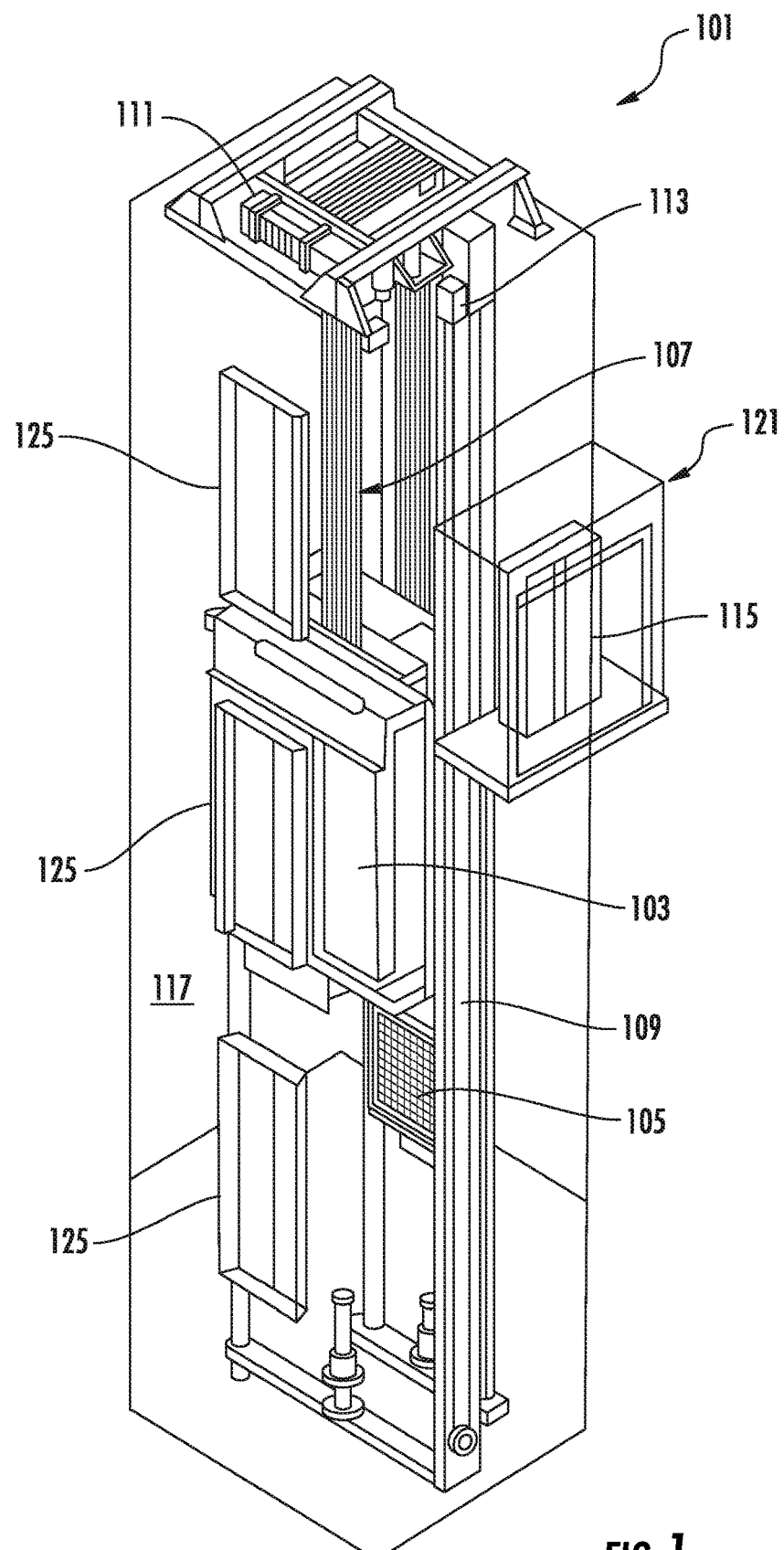
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and an elevator controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and passengers and is configured to facilitate movement of the elevator car 103 concurrently and in an opposite direction with respect to the counterweight 105 within an elevator shaft 117 and along the guide rail 109. As used herein, the term "traveling component" refers to either of the elevator car 103 or the counterweight 105.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The elevator controller 115 is located, as shown, in a controller room 121 of the elevator shaft 117 and is configured to control the operation of the elevator system 101, and particularly the elevator car 103. For example, the elevator controller 115 may provide drive signals to the machine 111 to control the acceleration, deceleration, leveling, stopping, etc. of the elevator car 103. The elevator controller 115 may also be configured to receive position signals from the position reference system 113 or any other desired position reference device. When moving up or down within the elevator shaft 117 along guide rail 109, the elevator car 103 may stop at one or more landings 125 as controlled by the elevator controller 115. Although shown in a controller room 121, those of skill in the art will appreciate that the elevator controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
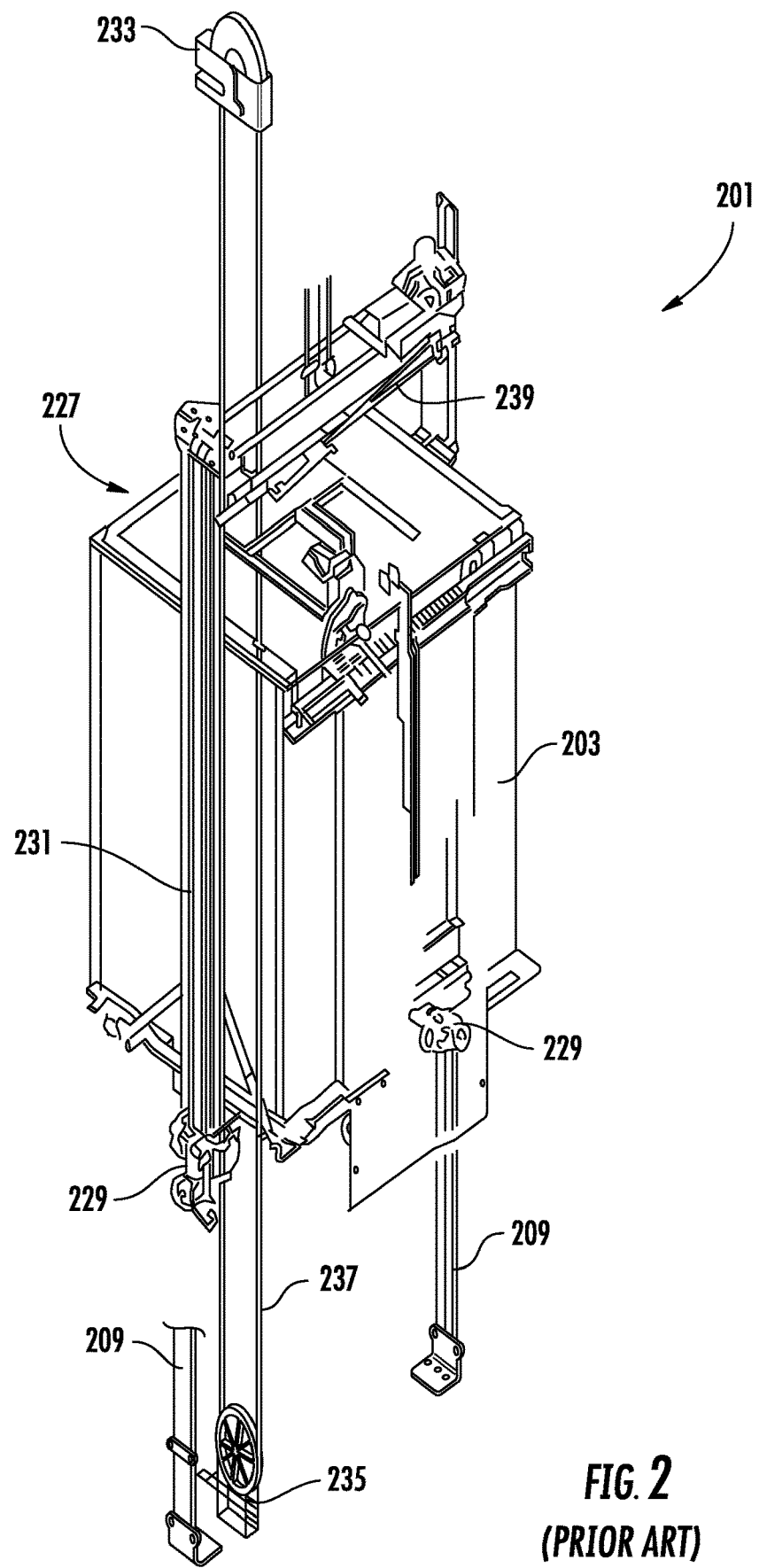
FIG. 2 is a prior art arrangement of an overspeed safety system for elevators.

Turning to FIG. 2, a schematic illustration of a prior elevator car overspeed safety system 227 of an elevator system 201 is shown. The elevator system 201 includes an elevator car 203 that is movable within an elevator shaft along guide rails 209. In this illustrative embodiment, the overspeed safety system 227 includes a pair of braking elements 229 that are engageable with the guide rails 209. The braking elements 229 are actuated, in part, by operation of lift rods 231. The triggering of the braking elements 229 is achieved through a governor 233, typically located at the top of the elevator shaft, which includes a tension device 235 located within the pit of the elevator shaft with a cable 237 operably connecting the governor 233 and the tension device 235. When an overspeed event is detected by the governor, the overspeed safety system 227 is triggered, and a linkage 239 is operated to actuate both lift rods 231 simultaneously such that a smooth and even stopping or braking force is applied to stop the travel of the elevator car. The linkage 239, as shown, is located on the top of the elevator car 203. However, in other configurations, the linkage may be located below a platform (or bottom) of the elevator car. As shown, various components are located above and/or below the elevator car 203.

Figure 3A:
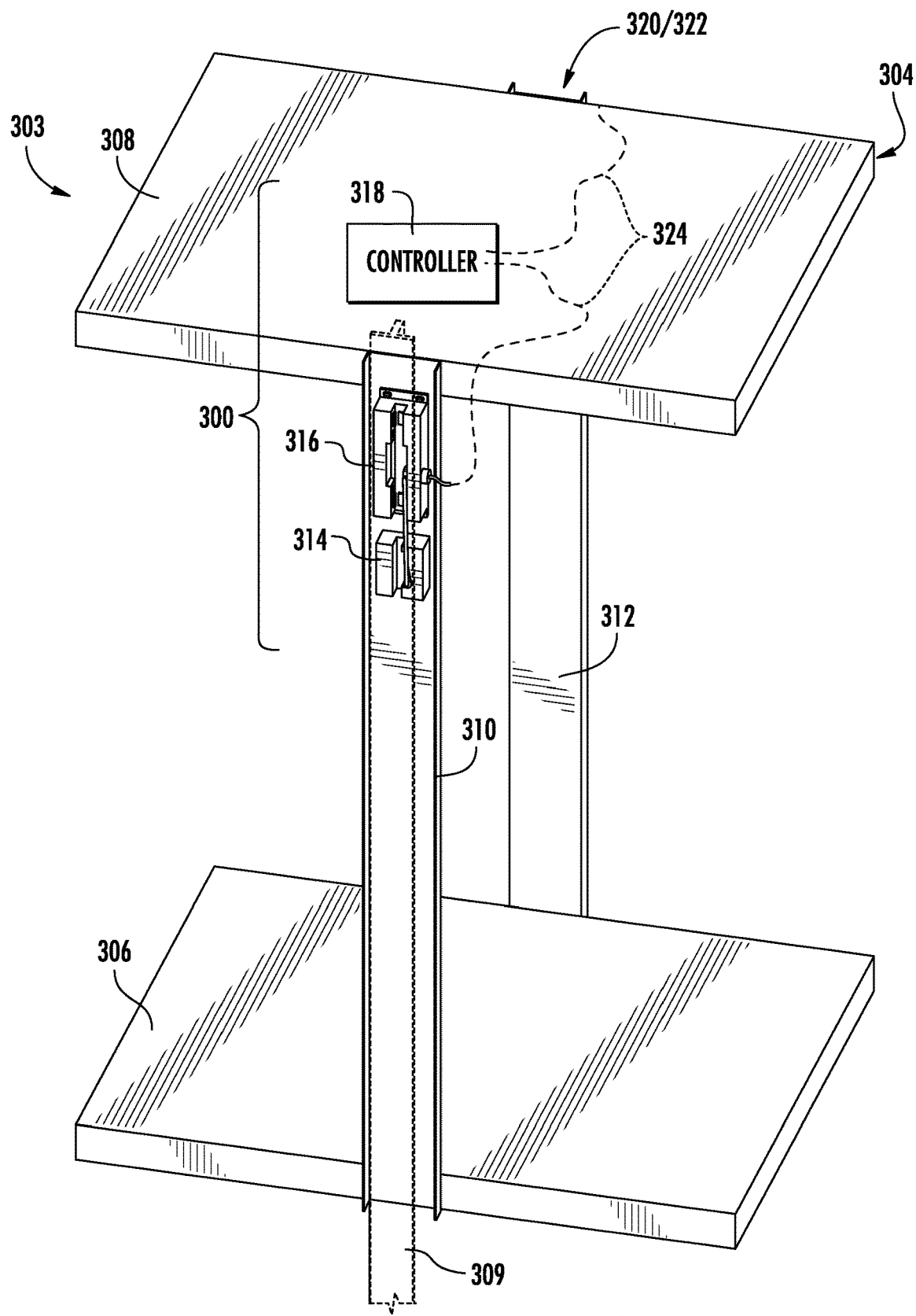
FIG. 3A is an isometric illustration of an elevator car frame having an overspeed safety system that may incorporate an embodiment of the present disclosure.
Figure 3B:
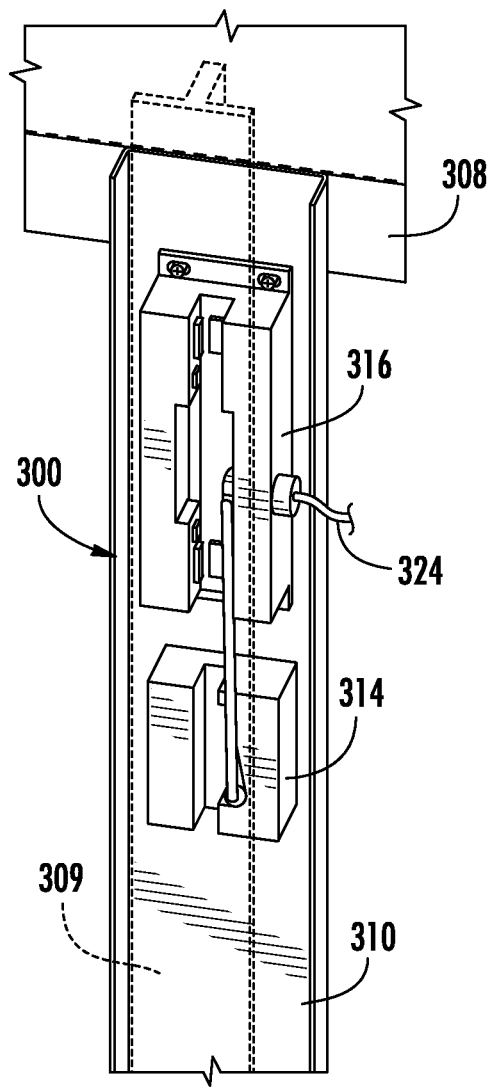
FIG. 3B is an enlarged illustrative view of a portion of the overspeed safety system of FIG. 3A.
Figure 3C:
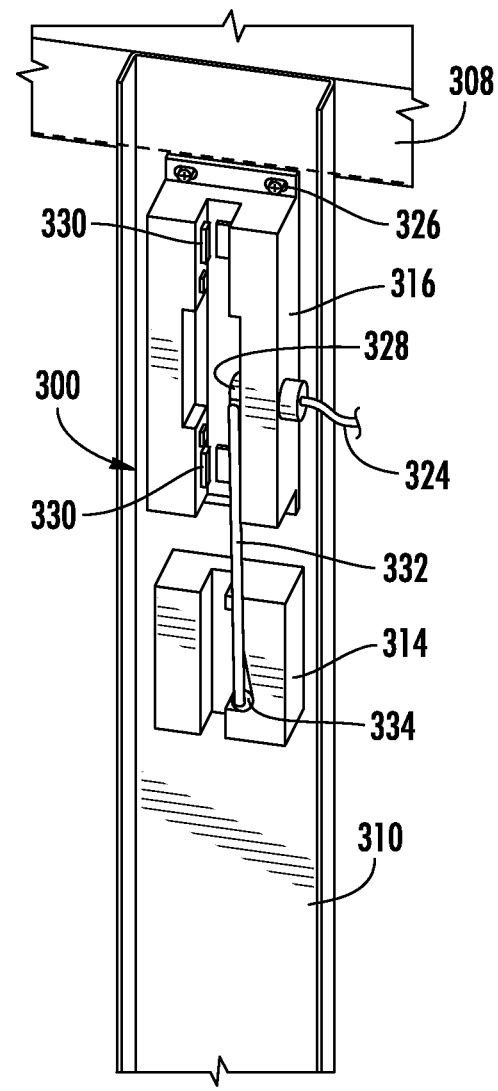
FIG. 3C is the same view as FIG. 3B, but with a guide rail removed for clarity.

Turning now to FIGS. 3A-3C, schematic illustrations of an elevator car 303 having an overspeed safety system 300 in accordance with an embodiment of the present disclosure are shown. FIG. 3A is an isometric illustration of an elevator car frame 304 with the overspeed safety system 300 installed thereto. FIG. 3B is an enlarged illustration of a portion of the overspeed safety system 300 showing a relationship with a guide rail. FIG. 3C is a schematic similar to FIG. 3B, but with the guide rail removed for clarity of illustration.

The car frame 304 includes a platform 306, a ceiling 308, a first car structural member 310, and a second car structural member 312. The car frame 304 defines a frame for supporting various panels and other components that define the elevator car for passenger or other use (i.e., define a cab of the elevator), although such panels and other components are omitted for clarity of illustration and the car frame design is for illustrative and example purposes only and any design may be employed without departing from the scope of the present disclosure. The elevator car 303 is moveable along guide rails 309, similar to that shown and described above. The overspeed safety system 300 provides a safety braking system that can stop the travel of the elevator car 303 during an overspeed event.

The overspeed safety system 300 includes a first safety brake 314, a first electromechanical actuator 316, and a control system or safety system controller 318 operably connected to the first electromechanical actuator 316. The first safety brake 314 and the first electromechanical actuator 316 are arranged along the first car structural member 310. A second safety brake 320 and a second electromechanical actuator 322 are arranged along the second car structural member 312. It is noted that although a specific arrangement is shown and described, those of skill in the art will appreciate that any desired number of guide rails, safeties, etc. may be employed without departing from the scope of the present disclosure.

The safety system controller 318 is also operably connected to the second electromechanical actuator 322. The connection between the safety system controller 318 and the electromechanical actuators 316, 322 may be provided by a communication line 324. The communication line 324 may be wired or wireless, or a combination thereof (e.g., for redundancy). As shown, the safety system controller 318 is located on the top or ceiling 308 of the car frame 304. However, such position is not to be limiting, and the safety system controller 318 may be located anywhere within the elevator system (e.g., on or in the elevator car, within a controller room, etc.). The safety system controller 318 may comprise electronics and printed circuit boards for processing (e.g., processor, memory, communication elements, electrical buss, etc.). Thus, the safety system controller 318 may have a very low profile and may be installed within ceiling panels, wall panels, or even within a car operating panel of the elevator car 303.

The overspeed safety system 300 is an electromechanical system that eliminates the need for a linkage or linking element installed at the top or bottom of the elevator car. The safety system controller 318 may include, for example, a printed circuit board with multiple inputs and outputs. In some embodiments, the safety system controller 318 may include circuitry for a system for control, protection, and/or monitoring based on one or more programmable electronic devices (e.g., power supplies, sensors, and other input devices, data highways and other communication paths, and actuators and other output devices, etc.). The safety system controller 318 may further include various components to enable control in the event of a power outage (e.g., capacitor/battery, etc.). The safety system controller 318 may also include an accelerometer and/or absolute position reference system to determine a speed and/or acceleration of an elevator car. In such embodiments, the safety system controller 318 is mounted to the elevator car, as shown in the illustrative embodiments herein.

The safety system controller 318, in some embodiments, may be connected to and/or in communication with a car positioning system, an accelerometer mounted to the car (i.e., a second or separate accelerometer), and/or to the elevator controller. Accordingly, the safety system controller 318 may obtain movement information (e.g., speed, direction, acceleration) related to movement of the elevator car along an elevator shaft. The safety system controller 318 may operate as part of and/or independently of other systems, other than potentially receiving movement information, to provide a safety feature to prevent overspeed events.

The safety system controller 318 may process the movement information provided by a car positioning system to determine if an elevator car is over speeding beyond a certain threshold or accelerating beyond a threshold. If the threshold is exceeded, the safety system controller 318 will trigger the electromechanical actuators and the safety brakes. The safety system controller 318 will also provide feedback to the elevator control system about the status of the overspeed safety system 300 (e.g., normal operational position/triggered position).

Although FIG. 3 is illustratively shown with respect to an elevator car, the configuration of the overspeed safety system may be similar to any traveling component (e.g., counterweight). The overspeed safety system 300 of the present disclosure enables electrical and electromechanical safety braking in the event of overspeed, overacceleration, and/or free fall events (hereinafter "triggering events"). The electrical aspects of the present disclosure enable the elimination of the physical/mechanical linkages that have traditionally been employed in overspeed safety systems. That is, the electrical connections allow for simultaneous triggering of two separate safety brakes through electrical signals, rather than relying upon mechanical connections.

With reference to FIG. 3C, details of parts of the overspeed safety system 300 are shown. The first electromechanical actuator 316 is mounted to the first car structural member 310 using one or more fasteners 326 (e.g., floating fasteners). The electromechanical actuator may be mounted above or below a safety brake, via an additional bracket, as will be appreciated by those of skill in the art. The first electromechanical actuator 316 includes an actuator element 328 and guidance elements 330. The first electromechanical actuator 316 is operably connected to the safety system controller 318 by the communication line 324. The safety system controller 318 can transmit an actuation signal to the first electromechanical actuator 316 (and the second electromechanical actuator 322) to perform an actuation operation when a triggering event is detected. The first electromechanical actuator 316 will actuate a connecting link 332 that is operably connected to the first safety brake 314. When the connecting link 332 is actuated, the first safety brake 314 will actuate to engage with the guide rail 309, e.g., using a safety brake element 334, such as a safety roller or wedge. In some embodiments, the safety brake and the electromechanical actuator may be combined into a single assembly, and the present illustration and description is provided for example and explanation only, and is not intended to be limiting.

Embodiments of the present disclosure are directed to replacing the electromechanical actuator with a roller guide actuator system. That is, with respect to FIGS. 3A-3C, the electromechanical actuator 316 will be eliminated, and the connecting link 332 is connected to a roller guide actuator, as shown and described herein. The roller guide actuator system includes a roller guide that is operably connected to a roller guide actuator that includes a connection or connecting link to a safety brake (e.g., wedge or other structure). The roller guide includes an encoder, which may be configured as an absolute position system or device, and is connected to and/or in communication with a safety system controller to enable overspeed detection. By detecting an overspeed event using the encoder and having the roller guide actuator operably connected to the roller guide, a lifting force acting on the safety brake can be made more reliable as compared to prior systems. Further, a response time in the event of a detected overspeed may be improved. It is noted that embodiments of the present disclosure may be employed with conventional or typical roller guides, and thus may be implemented as a retro-fit type installation. In other embodiments, a roller guide may be manufactured with embodiments described herein integrated therein, and installed as a complete unit. Further, typically a roller guide includes three rollers, and embodiments described herein may be implemented on each of the rollers of a roller guide, or on some number of rollers less than all of the rollers. Furthermore, embodiments provided herein may be implemented on one or more roller guides of a given traveling component, and each traveling component of an elevator system can include one or more of the roller guide actuator systems described herein.

Figure 4B:
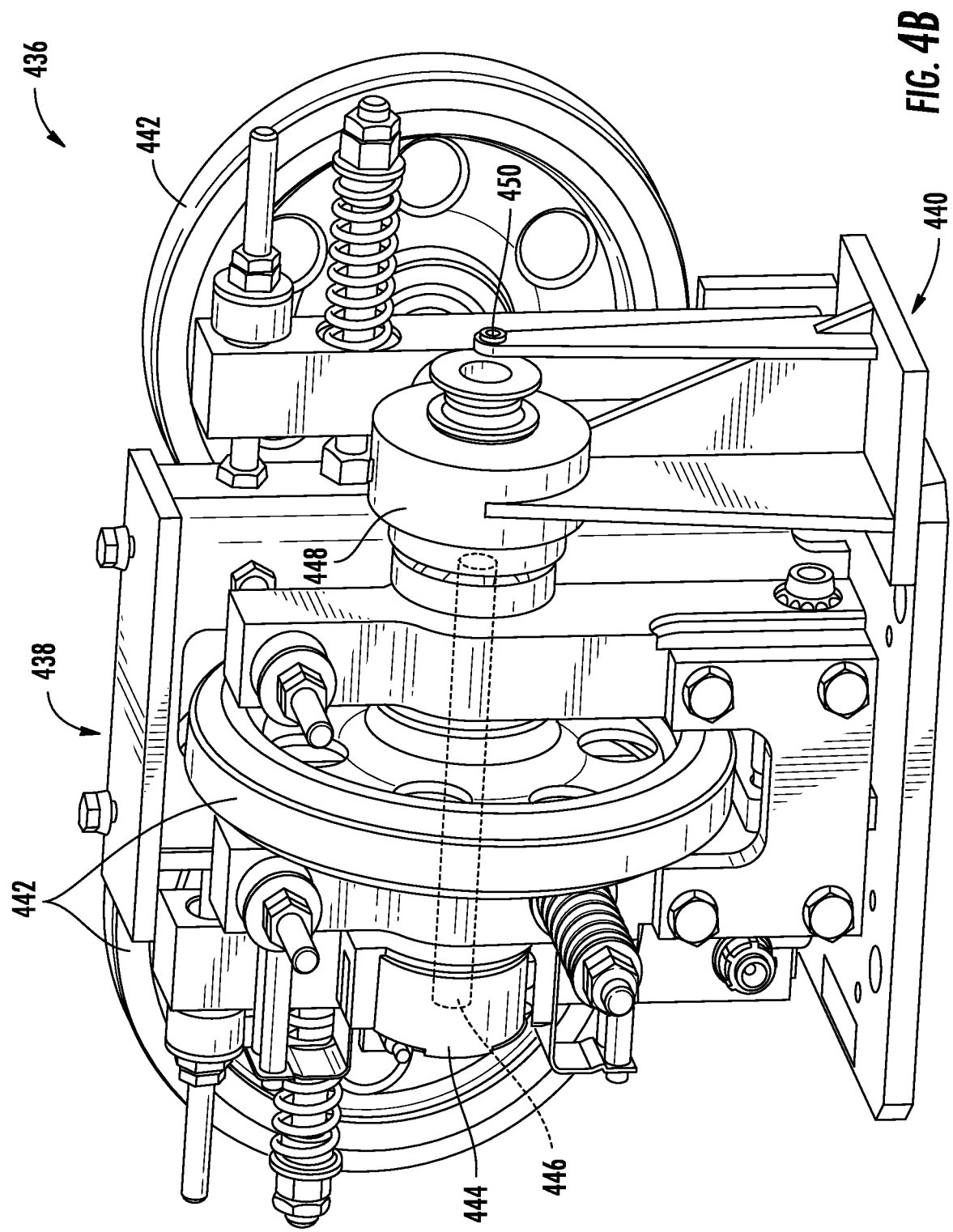
FIG. 4B is a schematic illustration of the roller guide actuator system as assembled.

Turning now to FIGS. 4A-4B, schematic illustrations of a roller guide actuator system 436 in accordance with an embodiment of the present disclosure are shown. FIG. 4A illustrates the roller guide actuator system 436 in a semi-exploded view and FIG. 4B illustrates the roller guide actuator system 436 as assembled. The roller guide actuator system 436 may operate similarly to the above described safety systems, employing a safety brake that is engageable with a guide rail to apply a braking force. The roller guide actuator system 436 includes a roller guide 438 and an actuator module 440. Each of the roller guide 438 and the actuator module 440 are operably connected and/or in communication with a safety system controller 418. The safety system controller 418 may be similar to that described above, and thus further description may be omitted. The safety system controller 418 is configured to review information from one or both of the roller guide 438 and the actuator module 440 (or parts thereof) and further may be configured to control or trigger operation of the actuator module 440 during an overspeed event.

The roller guide 438 is configured to be mounted to an elevator car, as known in the art. The roller guide 438 includes one or more rollers 442 that are operably engageable with a guide rail of an elevator system, as known in the art. Further, the roller guide 438 includes one or more encoders 444. A single encoder 444 is shown in FIG. 4, with the encoder 444 operably connected to one of the rollers 442. However, in other embodiments, additional encoders may be included in the system, without departing from the scope of the present disclosure. For example, encoders may be implemented within multiple rollers of a single roller guide and/or encoders may be implemented in multiple different roller guides. In some such systems employing a multiple-encoder system, a speed of a traveling component may be detected by averaging the output from each of the encoders. Further, in some such embodiments, with multiple encoders, the speed may be averaged from different encoders with any outlier data (e.g., extreme measurements) beyond a given threshold being discarded from the average calculation. The encoder 444 is connected to the roller 442 along an axis or axel thereof (e.g., shaft 446 shown in FIG. 4B), such that the encoder 444 is configured to detect or measure rotation of the roller 442. The encoder 444 is configured in communication with the safety system controller 418 through a communication line 424, which may be wired and/or wireless.

The actuator module 440 is also operably connected to the roller 438, as described herein, and in communication with the safety system controller 418 through a communication line 424, which may be wired and/or wireless. The actuator module 440 is operably connected to the shaft 446 of the roller guide 438. The actuator module 440 includes a roller engagement portion 448 and an optional sensor portion 450 for monitoring the state of the roller engagement portion 448. A connecting link 432 is operably connected to the actuator module 440 and specifically to the roller engagement portion 448. In this embodiment the connecting link 432 is a cable or wire that may be wound about a reel or other structure.

In operation, the safety system controller 418 may detect an overspeed event through input received from the encoder 444. Upon detection of the overspeed event, the safety system controller 418 may cause the actuator module 440 to engage with the shaft 446 of the roller guide 438, which in turn causes the connecting link 432 to be operated and actuate or activate a safety brake (as described above). In some embodiments, the connecting link 432 may be wound about a reel that is rotated when the actuator module 440 engages with the shaft 446. That is, the rotation of the shaft 446 by the roller 442 will cause the actuator module 440 to operate the connecting link 432 and thus engage a safety brake.

Figure 5:
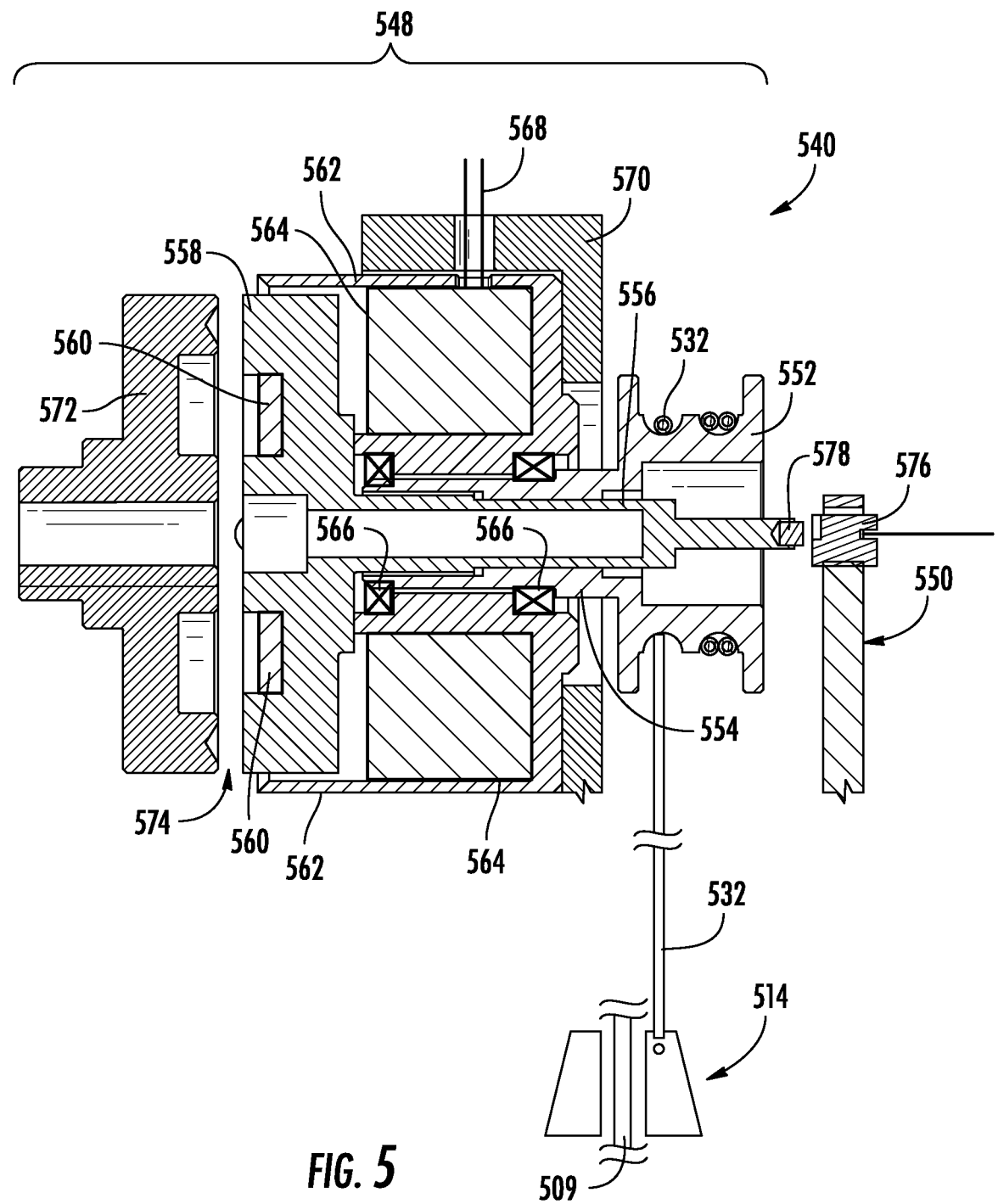
FIG. 5 is a schematic illustration of an actuator module of a roller guide actuator system in accordance with an embodiment of the present disclosure.

Turning now to FIG. 5, a schematic illustration of an actuator module 540 of a roller guide actuator system in accordance with an embodiment of the present disclosure is shown. The actuator module 540 is operably connected to a safety brake 514 which is engageable with a guide rail 509, as will be appreciated by those of skill in the art. The actuator module 540 includes a connecting link 532 that is wound about a reel 552. In operation, when the connecting link 532 is wound about the reel 552, the safety brake 514 will be operated (e.g., the connecting link 532 may pull upward upon a wedge of the safety brake 514). The reel 552 is connected to a bushing 554 which is arranged about a drive shaft 556. The bushing 554 is configured such that rotation of the drive shaft 556 will cause the bushing 554 to rotate, which in turn will cause the reel 552 to rotate and wind the connecting link 532 about the reel 552. It is noted that the present description is intended to be illustrative of operation of embodiments of the present disclosure. In some embodiments, the connecting link may include a solid component, e.g., a bar or rod, that connects a rotating part of the roller guide actuator system to the safety brake. For example, in one such configuration, the illustrative "reel" may be a geared or toothed wheel that causes a toothed rod to translate up and/or down during activation/deactivation of the safety brake. In other embodiments, a cord, cable, or wire may be operably coupled to a rigid component to cause operation of the safety brake.

The drive shaft 556 includes a first disc 558 operably connected thereto, or integrally formed therewith. The first disc 558 is configured to contain one or more magnetic elements 560. In some embodiments, the magnetic elements 560 are permanent magnets. The drive shaft 556, the first disc 558, the bushing 554, and the reel 552 are all arranged relative to a coil housing 562. The coil housing 562 houses a coil 564 which is configured to be energized to generate a magnetic field that is operable upon the magnetic elements 560 within the first disc 558. As shown, the bushing 554 and the drive shaft 556 pass through a portion of the coil housing 562. In some embodiments, such as that shown, one or more bearings 566 may be arranged between the bushing 554 and the coil housing 562 to enable free movement of the bushing 554 relative to the coil housing 562. The coil 564 is connected to a safety system controller, as described above, by one or more leads 568. The leads 568 are configured to pass current into the coil 564 to thus energize the coil 564 and generate a magnetic field.

An actuator module housing 570 is configured to support the coil housing 562 and the other components therein. The actuator module housing 570 is arranged to position the first disc 558 relative to a second disc 572. The second disc 572 is configured to attach to or engage with a shaft of a roller guide (e.g., shaft 446 shown in FIG. 4B). Rotation of the shaft of the roller guide causes rotation of the second disc 572. During normal operation, the first disc 558 is separated from the second disc 572 by a gap 574. As such, during normal operation (e.g., a first position of the first disc), the second disc 572 rotates freely without causing rotation of the first disc 558. However, when the coil 564 is energized, a generated magnetic field will cause the first disc 558 to move toward the second disc 572 and engage therewith (e.g., a second position of the first disc). The movement of the first disc 558 is caused by a repulsive magnetic field applied to the magnetic elements 560, thus causing the first disc 558 to move away from the coil 564. When the first disc 558 move into proximity with the second disc 572, the first disc 558 will engage with the second disc 572 such that rotation of the second disc 572 will cause rotation of the first disc 558. As the first disc 558 rotates, the drive shaft 556 will be caused to rotate. As the drive shaft 556 rotates, so will the bushing 554, which in turn causes the reel 552 to rotate, and thus imitate activation of the safety brake 514 as the connecting link 532 is wound about the reel 552.

Although described as a repulsive magnetic force employed to cause the first disc 558 to be urged toward the second disc 572, such configuration is not to be limiting. That is, in accordance with embodiments of the present disclosure, a triggering signal may be sent from a controller to the roller guide actuator system, and such signal may cause engagement between a first disc and a second disc. Accordingly, various other mechanisms may be employed without departing from the scope of the present disclosure. For example, in one non-limiting embodiment, permanent magnets may be arranged in the second disc and an attractive force may pull upon the second disc into engagement with the first disc. Furthermore a biasing element, such as a spring, may be arranged to bias the first and second discs toward the engaged position (or the disengaged position), and an opposing force (e.g., magnetic force) may overcome such biasing force to cause disengagement (or engagement) of the first and second disc (e.g., during an overspeed event).

In some embodiments, the connection or engagement between the first disc 558 and the second disc 572 may be by magnetic engagement. In other embodiments, the connection or engagement may be mechanical between the first disc 558 and the second disc 572. For example, a protrusion and recess configuration may be provided such that protrusions of one of the first and second disc 558, 572 may engage with recesses of the other of the first and second disc 558, 572. The protrusion-recess configuration enables the transfer of the rotational movement of the second disc 572 to be imparted to the first disc 558. Although only a few examples of types of engagement or connection are described, those of skill in the art will appreciate that any type of temporary or transient engagement between the first disc 558 and the second disc 572 may be employed, wherein the engagement is only achieved in response to energizing the coil 564, and when not energized, the first disc 558 may be moved out of engagement or connection with the second disc 572. The various elements described above form or comprise a roller engagement portion 548, similar in arrangement as that shown in FIGS. 4A-4B.

The actuator module 540 also includes, as shown, an optional sensor portion 550 for monitoring the state of the roller engagement portion 548. That is, the sensor portion 550 is configured to monitor if the first disc 558 is engaged with the second disc 572. In this embodiment, the sensor portion 550 includes a sensor 576 which is positioned relative to the drive shaft 556 of the roller engagement portion 548 on a sensor arm or other structure. The sensor 576 may detect a detectable element 578 arranged on the end of the drive shaft 556. In some embodiments, the detectable element 578 may be a magnet, with the sensor 576 being a Hall-type sensor. In other embodiments, the detectable element 578 may be a marking that is detectable by a sensor 576 being an optical detector. Other sensor and detectable element configurations are possible without departing from the scope of the present disclosure. For example, reed switches, contact switches, or other contact or non-contact switches/sensors may be employed without departing from the scope of the present disclosure.

The sensor 576 may be configured in communication with the safety system controller to provide information to the safety system controller regarding the state of the actuator module 540. When the drive shaft 556 is rotated, the sensor 576 may detect the rotation of or the relative position of (e.g., distance to) the detectable element 578. For example, in a rotation configuration, if the sensor 576 detects rotation of the detectable element 578, the safety system controller may be informed that the first and second discs 558, 572 are engaged and the connecting link 532 is being operated to actuate the safety brake 514. In a position/distance configuration, when the detectable element 578 is moved due to movement of the drive shaft 556 caused by movement of the first disc 558 toward the second disc 572, the safety system controller may be informed that the first and second discs 558, 572 are engaged and the connecting link 532 is being operated or ready to actuate the safety brake 514.

Figure 6A:
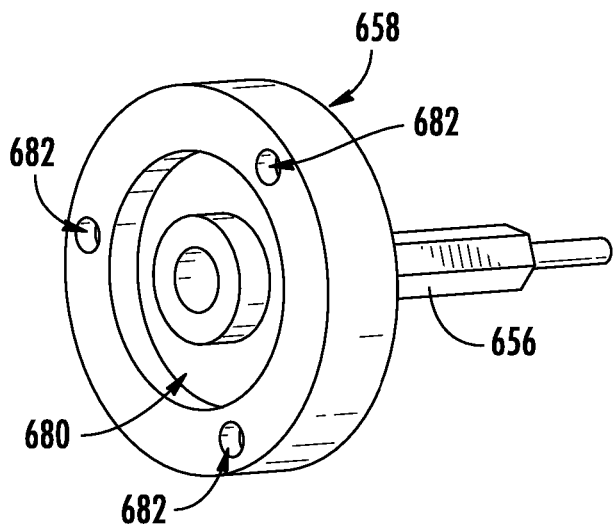
FIG. 6A is a schematic illustration of a first disc of a roller guide actuator system in accordance with an embodiment of the present disclosure.
Figure 6B:
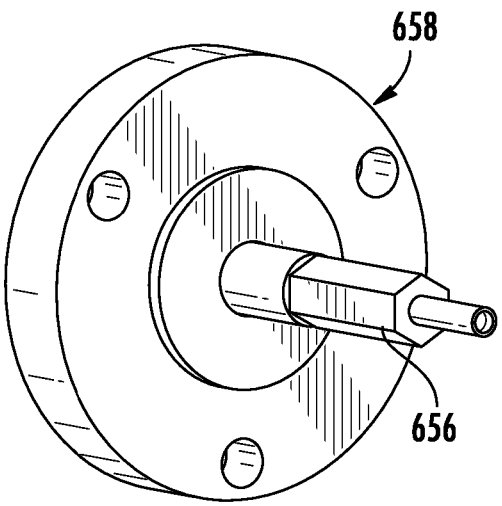
FIG. 6B is an alternative view of the first disc shown in FIG. 6A.

Turning now to FIGS. 6A-6B, schematic illustrations of a first disc 658 in accordance with an embodiment of the present disclosure are shown. FIGS. 6A-6B illustrate isometric views of the first disc 658. In this illustrative embodiment, the first disc 658 includes an integrally formed drive shaft 656. The drive shaft 656 is configured to be engaged with a bushing, as described above, to transfer rotational movement from the drive shaft 656 to the bushing. The first disc 658 includes a recess 680 configured to receive and house one or more magnetic elements (e.g., magnetic elements 560 shown in FIG. 5). Further, the first disc 658 includes one or more first engagement features 682. The first engagement features 682 may be recesses or holes with a device inserted therein, or may be fixed or integral parts, or may be recesses or slots for receiving a second engagement feature of the second disc, as described herein. In some embodiments, a pin may be inserted into a hole or slot of the first disc 658 to form the first engagement features 682. In some such embodiments, the pin may be biased with a spring or similar structure to allow movement of the pin relative to the first disc 658.

Figure 7A:
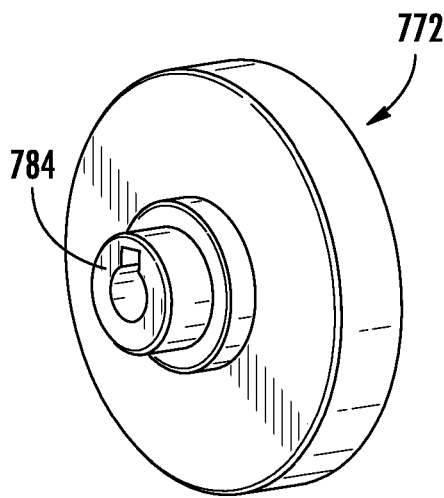
FIG. 7A is a schematic illustration of a second disc of a roller guide actuator system in accordance with an embodiment of the present disclosure.
Figure 7B:
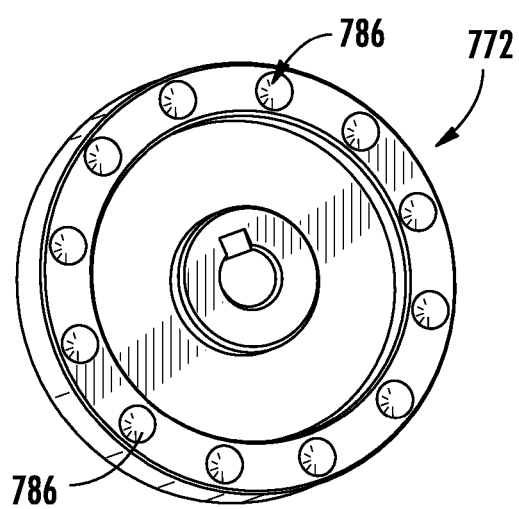
FIG. 7B is an alternative view of the second disc shown in FIG. 7A.

Turning now to FIGS. 7A-7B, schematic illustrations of a second disc 772 in accordance with an embodiment of the present disclosure. FIGS. 7A-7B illustrate isometric views of the second disc 772. The second disc 772, as discussed above, is configured to engage with a shaft of a roller guide and may be rotated by the shaft of the roller guide. Accordingly, in this embodiment, the second disc 772 includes a shaft engagement portion 784 for engagement with a shaft of a roller guide. The shaft engagement portion 784 may be slotted or otherwise configured to ensure that rotation of the shaft of the roller guide causes rotation of the second disc 772. Further, the second disc 772 includes one or more second engagement features 786. The second engagement features 786 are configured to interact with first engagement features of a first disc (e.g., as shown in FIGS. 6A-6B). In this illustrative embodiment, the second engagement features 786 are formed as recesses into which a pin or other structure (e.g., first engagement features) of the first disc may engage to enable the second disc 772 to cause rotation of the first disc.

Figure 8:
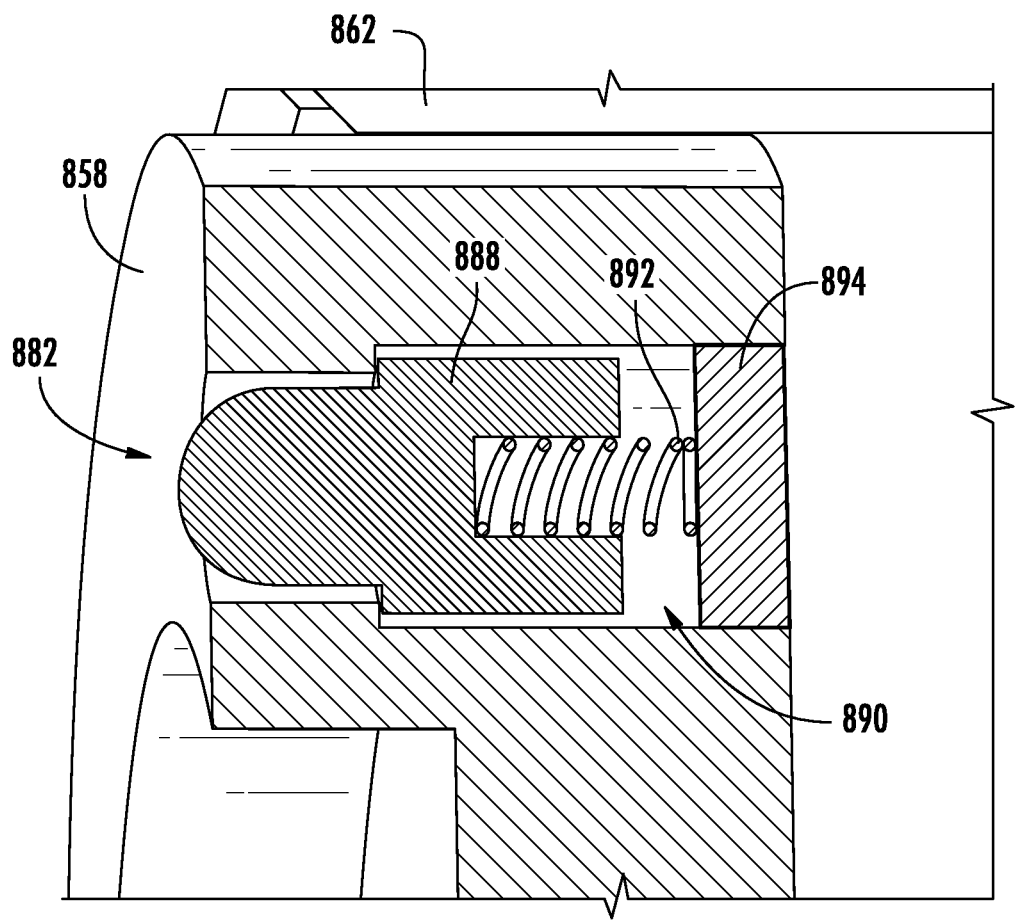
FIG. 8 is a schematic illustration of a portion of a first disc of a roller guide actuator system in accordance with an embodiment of the present disclosure.
Figure 9A:
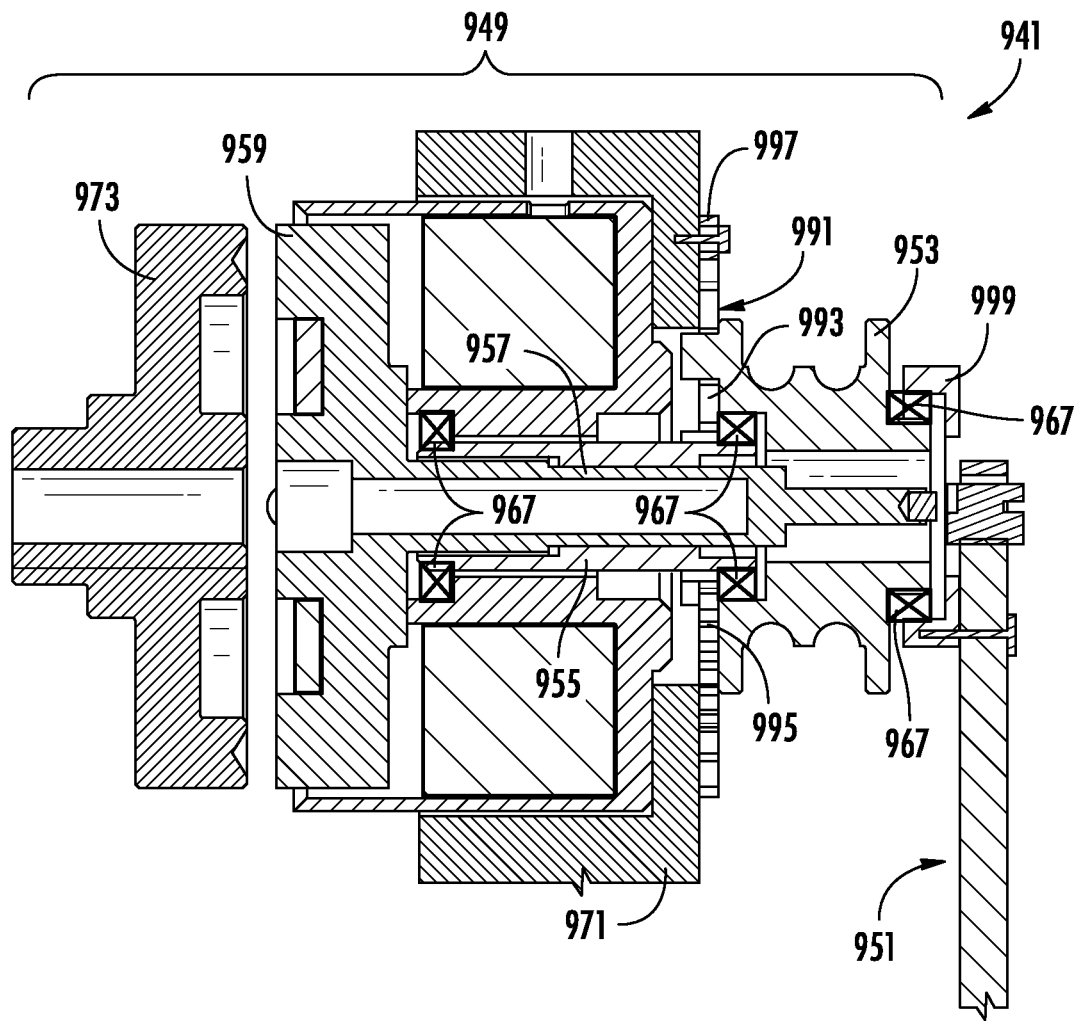
FIG. 9A is a schematic illustration of an alternative configuration of an actuator module in accordance with an embodiment of the present disclosure.
Figure 9B:
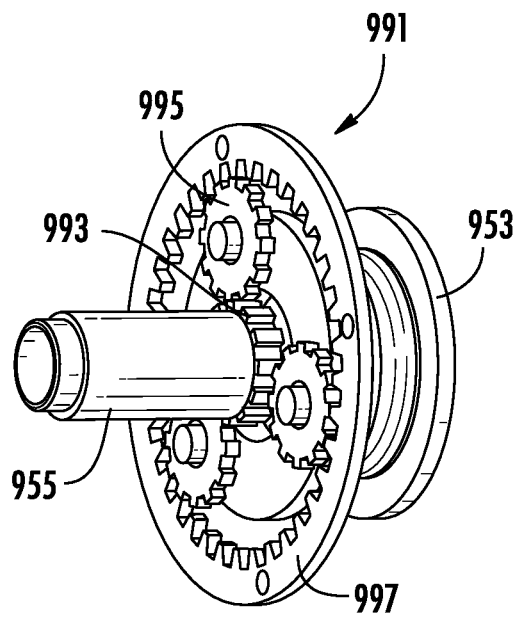
FIG. 9B is a schematic illustration of a gear assembly of the actuator module of FIG. 9A.
Figure 9C:
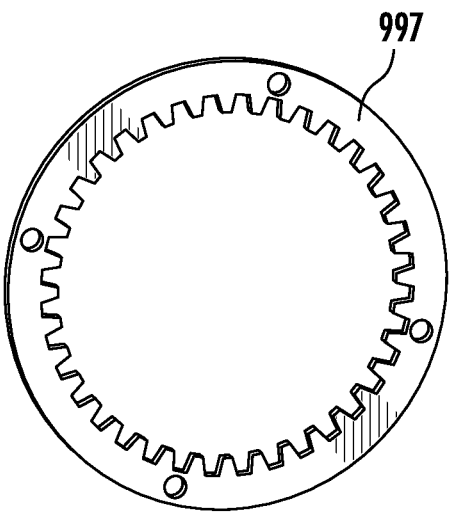
FIG. 9C is a schematic illustration of an outer gear of the gear assembly of FIG. 9B.
Figure 9D:
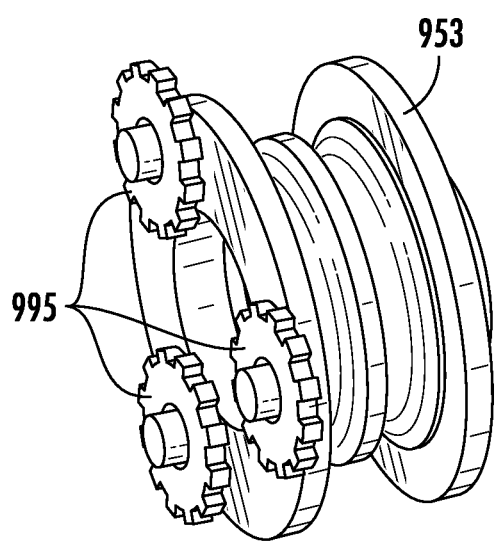
FIG. 9D is a schematic illustration of intermediate gears of the gear assembly of FIG. 9B.
Figure 9E:
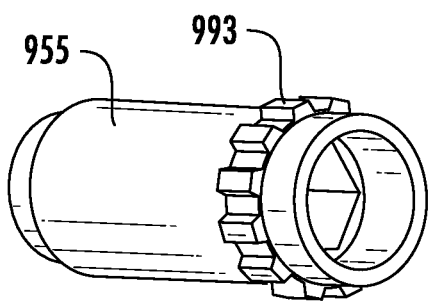
FIG. 9E is a schematic illustration of an inner gear of the gear assembly of FIG. 9B.

Turning now to FIG. 8, a schematic illustration of a portion of a first disc 858 is shown. The first disc 858 is shown housed within a coil housing 862, as described above. In this illustration, the first disc 858 includes a first engagement feature 882 in the form of a biased or spring-loaded pin. The first engagement feature 882 includes a pin 888 with is arranged within an aperture 890 formed in or through the first disc 858. The pin 888 is movably mounted within the first disc 858 such that when the first disc 858 is moved into engagement with a second disc, as described above, the pin 888 may be depressed within the aperture 890. In this embodiment, the pin 888 is mounted to a biasing element 892, which urges the pin 888 out of the aperture 890 of the first disc. However, when the pin 888 is aligned with a second engagement feature of the second disc (e.g., a divot, depression, recess, etc.), the pin 888 may be urged into engagement with the second engagement feature. In this embodiment, the biasing element 892 is a pre-loaded spring that may be adjusted using an adjust-nut 894. Once the torque from the second disc to the first disc is more than the pre-loaded setting, the first disc will rotate relative to the second disc (even when the two discs are in contact) to prevent over-torque to the connecting link. For example, once the safety brake is lifted to engagement with the guide rail (by the connecting link), it will stop the traveling component by deceleration (i.e., traveling component/roller guide will continue to move some distance/rotation). The prevention of the over-torque by use of the biasing element 892 will prevent extra force applied on connecting link as the second disc will be able to rotate without applying excessive force to the first disc.

The configuration shown in FIG. 8 is merely optional for the structure and configuration of the first disc 858, and other arrangements or features may be implemented without departing from the scope of the present disclosure. For example, the biased or spring-loaded pin is an optional feature, and not all discs in accordance with the present disclosure may include such features. In some embodiments, engagement between the first and second discs may be by friction only, due to smooth or textured surfaces of the discs in contact. Alternative, a toothed engagement may be implemented. Protruding features on one or both of the discs may be integral or fixed with respect to the disc or may be configured to be movable with respect to the disc (e.g., as shown in FIG. 8). In some such embodiments, the features may be arranged to prevent over-torque, as described above with respect to FIG. 8.

Turning now to FIGS. 9A-9E, schematic illustrations of an alternative configuration of an actuator module 941 in accordance with an embodiment of the present disclosure. The actuator module 941 may be similar to that shown and described above, having a roller engagement portion 949 and an optional sensor portion 951. The roller engagement portion 949 includes first disc 959 that is engageable with a second disc 973, as described above. The primary difference of this embodiment is the mechanism for causing rotation of a reel 953. In this embodiment, the first disc 959 rotates a drive shaft 957 as described above, which is engaged with a bushing 955. The bushing 955 is engageable with the reel 953 through a gear assembly 991, to thus impart rotational movement of the reel 953, and in turn operate a safety brake, as described above. In some embodiments, the gear assembly 991 may be configured as a planetary gear assembly.

With reference to FIGS. 9A-9E, the gear assembly 991 of this illustrative embodiment includes an inner gear 993, one or more intermediate gears 995, and an outer gear 997. The inner gear 993 is part of or attached to the bushing 955 such that rotation of the bushing 955 (e.g., by rotation of the first disc 959 and the drive shaft 957) causes rotation of the inner gear 993. The inner gear 993 causes the one or more intermediate gears 995 to rotate. The outer gear 997 is fixed to an actuator module housing 971, and the intermediate gears 995 rotate and move along teeth of the outer gear 997. The intermediate gears 995 are attached to the reel 953. Thus, as the intermediate gears 995 are rotated and moved relative to the fixed outer gear 997 by the rotating inner gear 993, the reel 953 will be rotated to operate a safety brake (e.g., by winding a connecting link as described above). In this illustrative embodiment, the reel 953 is also attached to or supported by the sensor portion 951 within a reel housing 999, as shown. One or more bearings 967 may be arranged between various components to enable relative movement between the components, as will be appreciated by those of skill in the art.

In some embodiments an overspeed detection may not be required to trigger operation of the safety break. For example, in a maintenance mode of operation, the first disc may be engaged to the second disc, even when the traveling component is stationary or not moving. However, if the traveling component suddenly moves during this maintenance mode of operation, and the discs are already engaged, when the roller guide moves along a guide rail, the actuator module will be operated to actuator or apply the safety brake. Thus, in some embodiments, operation of the actuator module may not be required to rely on an overspeed event, e.g., as detected by an encoder.

Although shown and described herein with respect to overspeed safety systems connected to traveling components such as elevator cars, such description is not to be limited. For example, the above described systems and processes may be applied equally to counterweights of elevator systems. In some such embodiments, the counterweight overspeed safety systems may be configured to prevent the counterweight from traveling upward or accelerating upward too rapidly and/or to prevent free fall and damage caused by a counterweight overspeed or overacceleration event. In other embodiments, an overspeed travel of the counterweight may be stopped by application of a safety brake of an elevator car that is traveling downward.

Further, overspeed safety systems may be bi-directional, enabling application of a braking force regardless of whether the traveling component is moving downward or upward within an elevator shaft. In such embodiments, the discs may be configured to rotate and/or wind the connecting link in either clockwise or counterclockwise rotations, based on rotation of the roller guide. Thus, the direction of movement of the traveling component is not to be limiting on applicability of embodiments of the present disclosure.

Advantageously, embodiments described herein provide overspeed safety systems that can provide controlled stopping of a traveling component in the event of an overspeed event. Embodiments described herein and variations thereof enable reliable lifting forces to act upon safety brakes through the application of a connecting link that is wound about a reel. The winding of the connecting link may be achieved through application of rotational movement from a roller guide, thus tying operation of the safety brake to operable components of an elevator moving components (e.g., elevator car, counterweight, etc.). Furthermore, because embodiments of the present disclosure are directly linked to movement of the elevator car (i.e., the roller guides), response time of a safety brake operation may be reduced compared to other systems.

The terminology used herein is for the purpose of describing particular embodiments only and is not intended to be limiting of the present disclosure. The term "about" is intended to include the degree of error associated with measurement of the particular quantity and/or manufacturing tolerances based upon the equipment available at the time of filing the application. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:
   a traveling component movable along a guide rail within an elevator shaft, the traveling component comprising a roller guide moveably engageable with the guide rail; and
   an overspeed safety system comprising:
   an actuator module operably coupled to the roller guide, the actuator module comprising a first disc configured to selectively engage with the roller guide, the first disc axially moveable along an axis of the first disc between a first position wherein an axial gap is present between the first disc and the roller guide and a second position wherein the first disc is moved axially along the axis of the first disc to engage with the roller guide such that rotation of a part of the roller guide causes rotation of the first disc; and
   a safety brake operably connected to the actuator module by a connecting link, wherein a safety brake element of the safety brake is operable to engage with the guide rail to stop movement of the traveling component.

2. The elevator system of claim 1, further comprising a reel operably connected to the first disc, wherein rotation of the first disc causes rotation of the reel.

3. The elevator system of claim 2, wherein the connecting link is windable about the reel, wherein when the connecting link is wound about the reel the connecting link causes the safety brake to engage with the guide rail.

4. The elevator system of claim 2, further comprising:
   a drive shaft connected to the first disc such that rotation of the first disc causes rotation of the drive shaft, wherein the drive shaft is arranged along the axis of the first disc; and
   a bushing connected to the reel and arranged about the drive shaft such that rotation of the drive shaft causes rotation of the reel.

5. The elevator system of claim 4, wherein the drive shaft is integrally formed with the first disc and the bushing is integrally formed with the reel.

6. The elevator system of claim 2, further comprising a gear assembly configured to transfer rotational movement of the first disc to the reel.

7. The elevator system of claim 6, wherein the gear assembly comprises an inner gear operably connected to the first disc, at least one intermediate gear operably connected to the reel, and an outer gear fixedly connected to an actuator module housing.

8. The elevator system of claim 7, wherein the inner gear is attached to or integrally formed with a drive shaft connected to the first disc.

9. The elevator system of claim 1, further comprising a second disc operably connected to the roller guide, wherein the second disc is axially aligned with the first disc and wherein in the second position the first disc is engaged with the second disc.

10. The elevator system of claim 9, wherein the second disc is operably connected to a shaft of the roller guide.

11. The elevator system of claim 10, wherein the first disc comprises at least one first engagement feature and the second disc comprises at least one second engagement feature, wherein when the first disc is engaged with the second disc, the at least one first engagement feature engages with the at least one second engagement feature.

12. The elevator system of claim 11, wherein the at least one first engagement feature comprises a pin and the at least one second engagement feature comprises a recess.

13. The elevator system of claim 12, further comprising a biasing element arranged to bias the pin into the recess.

14. The elevator system of claim 1, further comprising:
a magnetic element arranged within the first disc; and
a coil arranged within the actuator module, the coil configured to be energized to generate a magnetic field, wherein when energized the coil causes the first disc to transition from the first position to the second position.

15. The elevator system of claim 1, further comprising a safety system controller operably connected to the actuator module and configured to cause the first disc to transition between the first and second positions.

16. The elevator system of claim 15, further comprising an encoder operably connected to the roller guide, wherein the encoder is configured in communication with the safety system controller.

17. The elevator system of claim 16, wherein the encoder and the first disc are operably engageable with a single shaft of the roller guide.

18. The elevator system of claim 1, further comprising a sensor portion configured to detect operation of the actuator module.

19. The elevator system of claim 18, wherein the sensor portion comprises a sensor configured to detect a position of the first disc, wherein the sensor is configured to detect at least one of a position and a rotation of a detectable element operably connected to the first disc.

* * * * *